Figure 1:
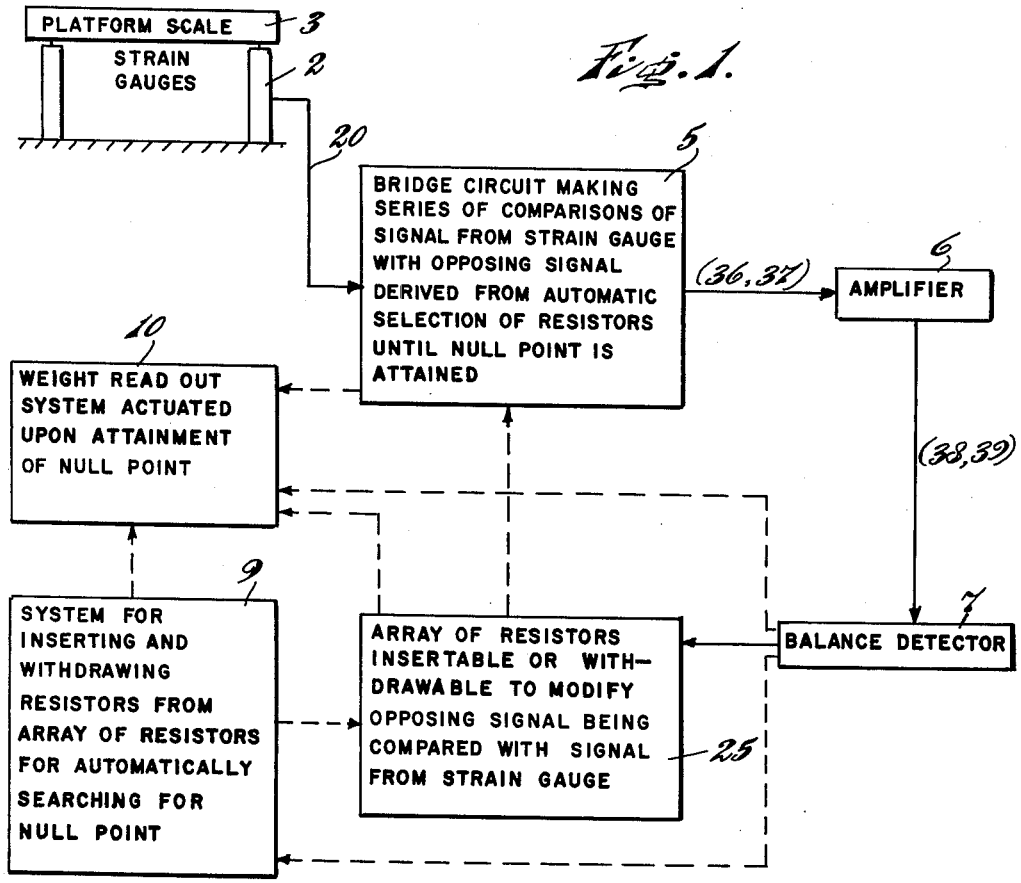

Oct. 12, 1965  J. A. POTTER  3,211,991
MINIMIZING OSCILLATION WHILE AUTOMATICALLY SEARCHING
FOR NULL POINT BY EMPLOYING ARRAY OF RESISTORS
FEATURING IDENTICAL RESISTORS
Original Filed Sept. 14, 1960  3 Sheets-Sheet 1

INVENTOR.
James A. Potter
BY
John R. Eubank
ATTORNEY

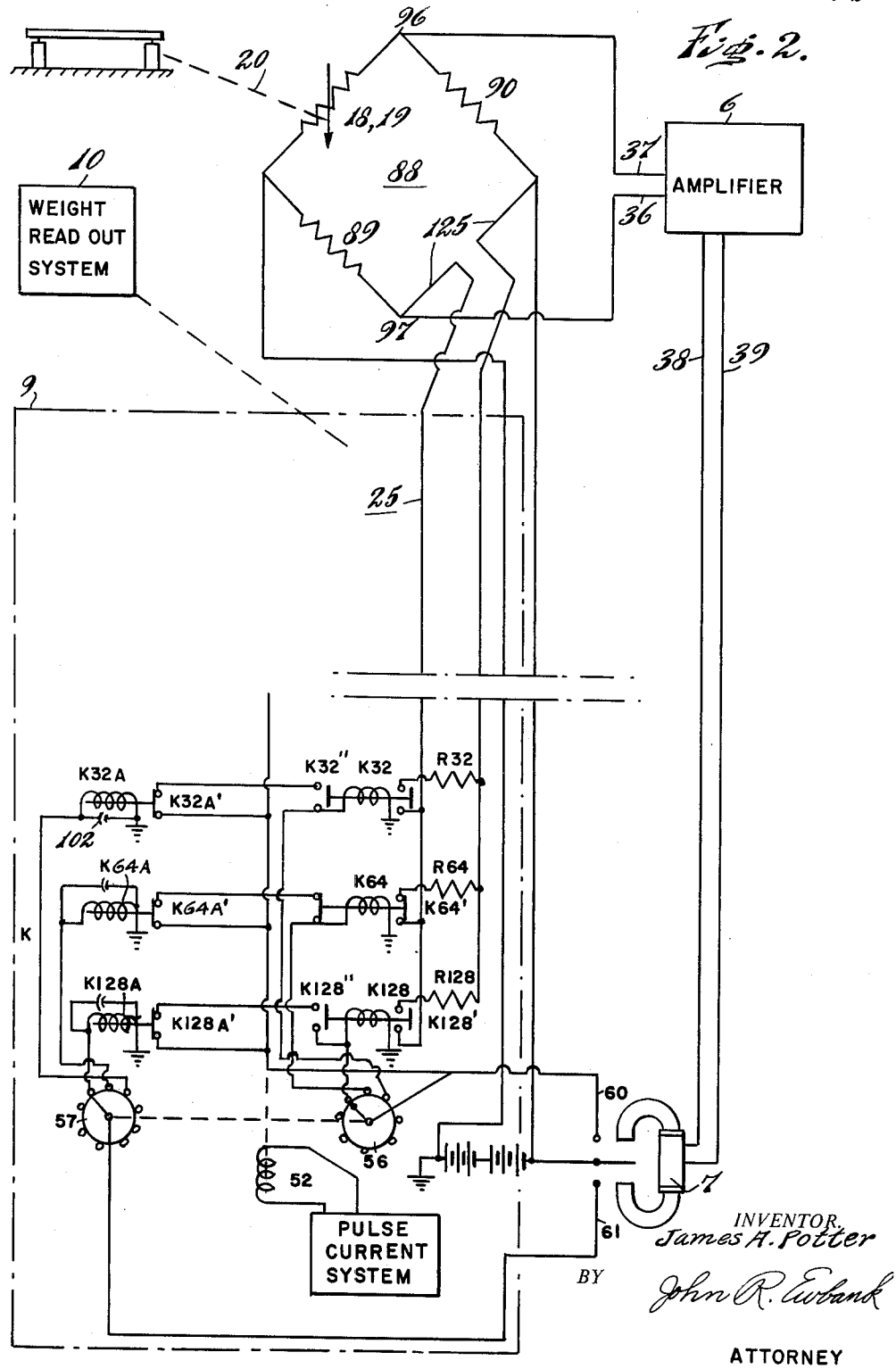

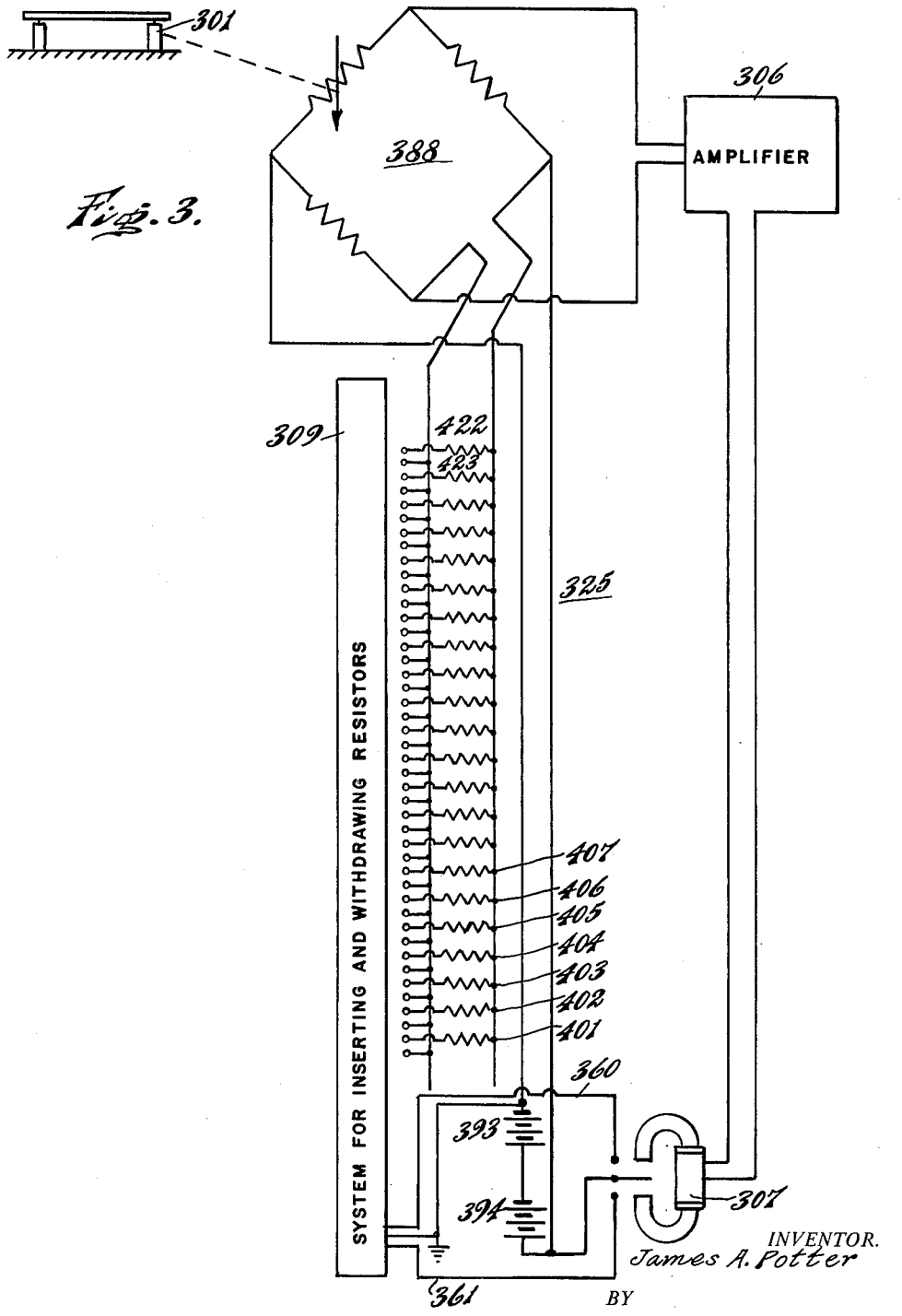

United States Patent Office 3,211,991
Patented Oct. 12, 1965

3,211,991
MINIMIZING OSCILLATION WHILE AUTOMATICALLY SEARCHING FOR NULL POINT BY EMPLOYING ARRAY OF RESISTORS FEATURING IDENTICAL RESISTORS
James A. Potter, 12 Greenhouse Blvd., West Hartford, Conn.
Continuation of application Ser. No. 55,847, Sept. 14, 1960. This application May 13, 1965, Ser. No. 455,464
8 Claims. (Cl. 323—75)

This application is a continuation of application Serial No. 55,847, filed Sept. 14, 1960.

This invention relates to a method for minimizing unstable oscillations during the automatic searching for the null point.

Reference is made to Thorsson 2,819,054, as an example of an apparatus in which resistors are inserted and withdrawn from a circuit during the automatic searching for a null point. Said patent recommends the use of an array of resistors complying with the binary numeral system, in which the values increase according to the series 1, 2, 4, 8, 16, 32, 64, 128, 256, 512, 1024, 2048, 4096, etc. Said patent describes the operation of weighing an object corresponding to the number 110, and requiring the withdrawal of all resistors higher than 64, the insertion of 64, 32, the withdrawal of 16, the insertion of 8, 4, and 2, and the attainment of the null point prior to testing 1. If the subsequent measurements were of weights corresponding to the numbers 129 and 95, very different combinations of the resistors in the array of resistors would be required for attaining the null points for such measurement. The method of searching for a null point involves a trial test of a particular resistor in the array of resistors, and the insertion or withdrawal of the thus tested resistor, followed by testing of the next appropriate member of the array of resistors, with the searching process reversing directions when necessary until the null point is attained.

The present invention is concerned with the numerical system employed in establishing the values of the resistors in the array of resistors, so that the mechanism or circuitry employed in the automatic searching for the null point is of no significance except as it aids in understanding the environment in which the improved array of resistors is employed. The three sets of relays for engaging or inserting resistors, for releasing or withdrawing resistors, and for reading out which of the resistors were selected, and the pulse generators for actuating the stepping switches in the Thorsson disclosure make the understanding of the patent more difficult than the general principle of automatically selecting resistors corresponding to the numbers 64, 32, 8, 4, and 2 to achieve the null point to balance the number 110. The Thorsson patent describes some of the circuitry suitable for one form of read out system, which is designated merely schematically in Thorsson's block diagram. Thorsson exemplifies an automatic weighing scale using a strain gauge as the transducer for providing the signal to a circuit in which the null point is searched for automatically by the insertion or withdrawal of resistors belonging to an array of resistors.

Certain types of electronic gauges, strain gauges, and the like, include a printer which reports the measured value in Arabic numerals, which printers are fed from a translator which converts the data from the instrument's numerical system, which translator is fed data when the bridge circuit has been stabilized after a logic circuit has conducted the hunt for the null value of the bridge circuit. In such instruments, the independent variable brings about a change in the value of an electrical resistance in one arm of the bridge so that the independent variable is measured by measuring the quantity of electrical resistance necessary for balancing the bridge circuit at the null point. Logic circuits responsive to the direction of the flow of current from the bridge control the introduction and withdrawal of a plurality of separate resistors from an array of resistors, so that the summation of such resistors approaches that necessary for the null point in the bridge circuit. The several resistors of an array of resistors are sequentially evaluated by a logic circuit effective in inserting and withdrawing individual resistors from the array of resistors until the various reversals of the hunting procedure automatically search for the null point. It is possible to employ servomechanisms for mechanically introducing or withdrawing the separate resistors, or it is possible to employ a series of electronic components such as vacuum tubes for switching on or off each of the members of the array of resistors.

In prior art devices involving any of the many feasible systems for automatic hunting for a null value in an electrical bridge circuit, the values of the resistances in the array of resistors have had values selected in accordance with an appropriate number system. For example, the simple binary system has provided the minimum number of resistors, having values 1, 2, 4, 8, 16, 32, 64, 128, 256, 512, etc. times the unit resistance, which unit resistance has generally corresponded to the last significant figure reported by the printer. In order to simplify the operation of the translator, it has sometimes been worthwhile to employ a decimal numerical system in which the resistors have 1, 2, 3, 4, 5, 6, 7, 8, 9, 10, 20, 30, 40, 50, 60, 70, 80, 90, 100, 200, 300, etc. times unit value. Many instruments can advantageously employ a decimal binary system having resistors of 1, 2, 4, 8, 10, 20, 40, 80, 100, 200, 400, 800, etc. times unit values. Certain other numerical systems have previously been employed in arranging such predetermined sequence of resistors as an array of resistors in order to expedite the automatic hunting for the null point.

Heretofore certain difficulties have been encountered in using the prior art automatic null-hunters using such prior-art numerical systems for the values of the resistors. Sometimes the experimental apparatus has initially worked according to the design, but after a short period of operation has developed a tendency to oscillate from some value above the some value below the null point without working toward the null point. Such tendencies toward oscillation have been attributed to the effect of age, temperature and weather upon resistors, and/or to measurements of values having a borderline magnitude. There has been a general failure to diagnose such oscillation problems as attributable to the numerical system employed.

In accordance with the present invention, a multiple integer numerical system is employed so that in the array of values, substantially every increase in the value along the predetermined series involves at least two but less than seventeen values of substantially the same value.

In accordance with the present invention, the time required for hunting a unique total number is reduced by employing a multiple radix numerical system, whereby the number of trial and error attempts to achieve the balancing magnitude is reduced. The present invention also contemplates the application of the multiple radix numerical system for the automatic balancing of systems asserted herein as equivalents of electrical bridge apparatus, which equivalents include pneumatic bridges, hydraulic balancing, mechanical weight balancing, and the like. The present invention is most conveniently defined in the claims and is most easily understood in connection with adding and withdrawing resistors for balancing an electrical bridge. The multiple radix numerical system of the present invention always involves a possibility of carryover from one group of numbers to the next larger group of numbers, and by reason of this rather the possibility of carryover, there may be a plurality of possibilities for achieving a null point instead of only a single possibility as prevails under some prior art systems. The speed with which the null point is found is greater because it can be found at any of such several combinations when the multiple radix numerical system of the present invention is employed. Because of the possibility of such carryover, the totalizer portion of the instrument may be more complicated, but this is more than compensated by the greater speed and reliability of the null-searching method using the multiple radix numerical system.

In describing an illustrative embodiment of the invention, reference is made to the use of resistors in a direct current bridge, but it should be noted that other types of electrical balancing systems, including bridges utilizing capicitors, inductors, and/or combinations thereof with or without resistors, benefit from the application of the multiple radix numerical system to the null-finding method.

The nature of the invention can be further clarified by detailed descriptions of embodiments of the method of the present invention.

An electronic pressure gauge comprises a printing circuit actuated by a translator fed by a circuit comprising a plurality of resistors added by the automatic hunting for the null point. As initially designed with the numerical system of the decimal-binary type, the apparatus is reliable for only a few hours, after which the apparatus has a tendency for oscillating between values above and below the null point without arriving at the null point. However, by modifying the gauge to employ a multiple radix numerical system, reliable stability of operation and freedom from troublesome oscillation are achieved. The multiple number system employed is one in which the resistors are controlled to be 1, 1, 2, 2, 4, 4, 10, 10, 20, 20, 40, 40, 100, 100, 200, 200, 400, 400, 1000, 1000, 2000, 2000, 4000, and 4000, unit resistance.

In alternative embodiments of the invention, the resistors or impedances have values such as 1, 1, 1, 1, 1, 3, 3, 10, 10, 10, 10, 10, 30, 30, 100, 100, 100, 100, 100, 300, 300, 1000, 1000, 1000, 1000, 1000, 3000, and 3000, thus illustrating how as many as five multiples of a number may be beneficial in the present invention.

In another embodiment of the invention, multiple possibilities for locating a null point after starting from any random arrangement are achieved by the use of a method characterized by the multiple radix numerical system and the use of resistors having unit values of 1, 1, 2, 2, 4, 4, 8, 8, 16, 16, 32, 32, 64, 64, 128, 128, 256, 256, 512, 512, 1024, 1024, 2048, 2048, 4096, and 4096. Under some conditions in which quick reporting of a frequently changing value is desired, the numerical system and resistors should follow a pattern of 1, 1, 1, 2, 2, 2, 4, 4, 4, 8, 8, 8, 16, 16, 16, etc.

In several embodiments of the inventions, each group of numbers provides a total greater than the first number of the next group of numbers, so that in totalizing the series, there is the possibility of carryover from each group to the next successive group, whereby the possibilities for achieving a null point starting from a random distribution of the resistors is increased. Because of the continuous operation of measuring instruments, the automatic searching for the null point does not start from an "all clear" position of the resistors, but from the distribution of the resistors as resulted from the previous measurement. Accordingly, if the searching for the null point must be for a single possibility, as contemplated in prior art automatic searching methods, the searching takes longer, on the average, than in the method of the present invention, in which any of many combinations of resistors will satisfy the null-point requirements.

The broader aspects of the invention can be described as involving a method for automatically making a series of corrections for the purpose of converting an attained magnitude to a designed magnitude while making a series of comparisons between such desired magnitude and the magnitude attained, said series of corrections being such that a plurality of correcting magnitudes can each exactly provide the required correction. This multiple solution possibility is achieved by the combination of the carryover possibility from each group to the next succeeding group and the presence of a plurality of substantially equivalent members in each group, that is, the use of the multiple radix numerical system. The present method of correcting the balance of magnitudes in a system employing an error signal fed back to achieve such correction involves the use of a combination of correction values, some substantially different from each other, but some substantially equal to each other, whereby a plurality of such combinations may achieve the necessary correction. By using the plurality of substantially equivalent values, the largest value utilized is smaller than in prior art methods. The accuracy of the components employed in an automatically balancing bridge is determined in part by the largest value employed to provide the required range of measurement. Thus, the multiple radix numerical system sometimes permits the use of less accurate, and therefore cheaper, components than would have been possible with prior art numerical systems. Some of the important advantages of the present method can be achieved by the use of a series of resistors having values of 1, 1, 1, 1, 1, 1, 1, 1, 1, 1, 1, 1, 1, 1, 1, 1, 10, 10, 10, 10, 10, 10, 10, 10, 10, 10, 10, 10, 10, 10, 10, ,10, etc., that is, a series of sixteen resistors of each of the decimal values, whereby there is a possibility of carryover from each group to the successive group when totalizing. However, fewer components are required if there only were about 5 instead of about 16 of substantially identical values before increasing the value, while progressing along the predetermined series, provided that the total of each group exceeds the number of the next higher group, thus guaranteeing the possibility of carryover, and thus tending to decrease the number of reversals of the operation for searching for the null point.

The invention can also be described in connection with the drawings, in which FIG. 1 is a block diagram of the operation of an automatic weighing scale comprising means for automatically searching for the null point. Said FIG. 1 is patterned generally after FIG. 1 of Thorsson 2,819,054, and illustrates the environment pertinent to the invention. FIG. 2 is a schematic showing of a circuit and apparatus suitable for automatically searching for a null point, and is helpful in understanding the operation of the array of resistors of Thorsson 2,819,054. FIG. 3 is a schematic showing of a circuit and apparatus embodying the present invention and featuring an array of resistors complying with a multiple radix numerical system so that a plurality of equal-valued resistors are in each group of resistors in the array of resistors.

Prior art practices are illustrated in the block diagram of FIG. 1 and in the schematic diagram of FIG. 2. Transducers such as strain gauges act as load cells 1, 2, (the numbering system generally following that of Thorsson 2,819,054) to send a signal 20 proportional to the weight placed on a platform scale 3. The signal from the strain gauges is compared with an opposing signal to generate raw error signal 36, 37. The raw error signal 36, 37, is shown as amplified by amplifier 6 (such amplifier being optional) to produce an error signal 38, 39, of sufficient strength to actuate balance detector 7. A correction signal 60 or 61, actuates the system 9 adapted to insert and/or withdraw resistors from an array 25 of resistors for automatically searching for the null point. Such insertion of resistors exactly balancing the signal for the strain gauge is sometimes designated as the operation of a logic circuit. Said logic circuit inserts and/or withdraws resistors from an array of resistors until such opposing signal exactly balances the signal from the strain gauges. After the null point has thus been attained by the automatic operation of the system 9 for inserting the resistors adequate for balancing, the read-out signal system 10 is actuated to print the measured weight to correspond with the total numerical value corresponding to the numerical values for the selected resistors. The series of comparisons are made in a circuit designated in the block diagram 5.

The operation of a logic circuit and the adding of the numbers corresponding to the values of the resistors can most readily be understood by consideration of a plurality of resistors in series, with the switching mechanisms shorting out one or more selected resistors. However, previous workers have generally found it advantageous to connect all resistors in parallel. Engineers accustomed to designing automatic null searchers are familiar with the mathematics involved in translating the values of a numerical system in series arrangement into an arrangement of parallel resistors having values such that the addition is the same as if the resistors were of such numerical system in series. Hence, the method is conveniently described as if the resistors were being added by series connections even when the switching affects translated values being combined in parallel. Said Thorsson 2,819,054, employs such series connotations in describing the manner of operation, notwithstanding circuitry showing resistors in parallel.

In the diagram of FIG. 2 the signal from the strain gauge 2 type of transducer is fed as a signal constituting a variable resistance in one arm of a bridge 88. The resistors in arms 89 and 90 are of equal value so that the bridge circuit 88 is balanced whenever the resistance in arm 125 equals the resistance of the strain gauge. Transducers 1, 2, of the platform scale 3 are shown in the electrical circuit as a variable resistor 18, 19. An electric current is fed to the bridge 88 at corners 91 and 92 from a voltage source, indicated as a pair of voltage sources 93, 94, in series. The other corners 96, 97 of the bridge, sometimes designated as the output from the bridge, supply the error signal for the balance detector 7, an amplifier 6 being used for the amplification of the error signal if desired. A raw error signal 36, 37, is shown in FIG. 2 as being transformed to a stronger error signal 38, 39 in the amplifier 6. If there is a correction signal from the balance detector 7 (that is, if the null point has not been attained), such correction signal flows either through signal line 60 to stepper switch 56 or through line 61 to stepper switch 57, in response to the polarity of the balance detector 7. These two stepping switches 56, 57, are actuated in unison by stepper coil 52, energized by a suitable pulse current system. In the switch 56, the contacts can successively energize coils K128, K64, K32, etc. When the switch 56 closes to send a current pulse to coil K128, a latching relay is actuated to close resistor switch K128' to connect resistor R128 into the circuit for balancing the bridge, but the energization of such coil K128 also latches the resistor into such bridge balancing arm 125 by closing normally open latching switch K128''. If the balance detector 7 sends a correction signal through conduit 61, then at the time when stepper switch 57 encounters the position corresponding to the number 128, a pulse of current is directed to unlatching coil K128A, which actuates a relay to open momentarily the normally closed unlatching switch K128', thus withdrawing resistor R128 from the circuit in which the null point is sought.

It should be understood that for each resistor R$n$ in the array of resistor, there is a set comprising latching coil K$n$, resistor switch K$n'$, latching swicth K$n''$, unlatching coil K$n$A, and unlatching switch K$n$A'. FIG. 2 shows R64 latched into the bridge balancing circuit and shows the normally open latching switch K64'' in the closed position. In order to control the period during which the unlatching switch K32A' is opened, a condenser 102 is connected in parallel to the unlatching coil K32A. Thorsson shows an array of resistors having values corresponding to the numbers 1, 2, 4, 8, 16, 32, 64, 128, etc., and normally initiates the search with the largest resistor. In the operation of the automatic null-searching system of FIG. 2 the pulse current system actuates the stepper coil 52 so long as the circuit is out of balance, and advances the stepper switch system around the various positions until the selection of resistors for balancing the circuit has been accomplished. Such null searching is sometimes described as a testing to determine whether the resistor being investigated should or should not be kept in the circuit in order to achieve the desired balance. The system comprising the driving of the stepper switches 56, 57 by the stepper coil 52 can also drive a system for transmitting data to the read-out system 10 as soon as a stable balance is detected by balance detector 7. Portion of the pulse current system can also be driven by such stepper coil 52.

A great variety of systems for automatically searching for a null point by the insertion or removal of resistors from an array of resistors have been described in previous literature. Inasmuch as the present invention is concerned with the numerical system employed for the values for the array of resistors, it should be understood that the arrangement of a pulse current system, stepper coil, at least a pair of stepping switches, latching relays, and unlatching relays, and switches for accomplishing the testing and utilization of the array of resistors is merely illustrative of one prior art embodiment of such a system.

Referring now, not to the prior art systems of FIG. 1 and 2, but to the present invention of FIG. 3, it will be seen that the system for automatically inserting or withdrawing resistors is shown in block diagram as 309. A transducer 301 transmits a signal to balancing circuit 388. A balance detector 307 is responsive to the error signal, or the absence thereof, from the balancing circuit 388, and sends appropriate signals to other apparatus, such as an add signal via line 360 or a withdraw signal via line 361 to the logic system 309.

The use or non-use of amplifier 306 is optional depending on the power requirements and sensitivity of balance detector 307. The signal from a transducer 301 provides the independent variable of the balancing circuit 388 and a logic circuit automatically balances such variable as the system 309 inserts and withdraws resistors from operative association with the circuit. The present invention is concerned primarily with the numerical system for the values of resistors in the array of resistors. Thorsson employed a binary number system. Others employed other numerical systems permitting only a single combination of resistors to satisfactorily balance the circuit. By the present invention, the values of the resistors comply with a multiple radix numerical system, whereby a variety of combinations of resistors can satisfactorily balance the circuit. FIG. 3 illustrates an array 325 of resistors in which the values of resistors correspond to triplicate sets of binary values, permitting carryover from each group to the next succeeding group. The additive values of resistors are utilized to understand their operation, although the resistance would correspond to that required by the parallel connection of resistors. FIG. 3 shows an array 325 of 22 resistors 401–422 corresponding to numbers 1, 1, 1, 2, 2, 2, 4, 4, 4, 8, 8, 8, 16, 16, 16, 32, 32, 32, 64, 64, 64, 128, etc.

Various modifications of the invention are possible without departing from the invention as set forth in the appended claims.

This invention claimed is:

1. In an electrical system in which a logic circuit automatically searches for a null point in a bridge circuit and in which there is a tendency for the correction signal to initiate an undesirably large number of reversals of the direction of the searching for the insertion to the correct total of resistors into one arm of said bridge circuit, said logic circuit being responsive to the correction signal from the bridge circuit, and said logic circuit automatically inserting and withdrawing sequentially and cumulatively resistors from an array of resistors until the operation of the logic circuit successfully searches for a null point of the bridge circuit, at which time the total of the then inserted resistors constitutes the significant total for which the searching was conducted, the improvement in the array of resistors for insertion or withdrawal into said arm of said bridge circuit by the operation of said logic circuit which consists of providing at least two but not more than sixteen resistors of equal value in each group of resistors, the total value of a group of resistors being greater than the value of a member of the next largest group of resistors, providing the possibility of carryover from a group to the next group, whereby the null point can be achieved by any of many combinations of resistors, whereby the average time for searching for a null point in each of a series of successive searches is significantly less than when the array of resistors consists of only a series in which each resistor has a value different from each other, and whereby during prolonged periods of use in which some resistors might undergo small changes from their intended values, the likelihood of inability to reach a null point is significantly less than when the array of resistors consists of only a series in which each resistor has a value different from each other.

2. In a system in which a logic circuit automatically searches for a null point in a bridge circuit and in which there is a tendency for the correction signal to initiate an undesirably large number of reversals of the direction of the searching for the insertion of the correct total of values into one arm of said bridge circuit, said logic circuit being responsive to the correction signal from the bridge circuit, and said logic circuit automatically inserting and withdrawing sequentially and cumulatively values from an array of values until the operation of the logic circuit successfully searches for a null point of the bridge circuit, at which time the total of the then inserted values constitutes the significant total for which the searching was conducted, the improvement in the array of values for insertion or withdrawal into said arm of said bridge circuit by the operation of said logic circuit which consists of providing at least two but not more than sixteen equal values in each group of values, the total value of a group of values being greater than the value of a member of the next largest group of values, providing the possibility of carryover from a group to the next group, whereby the null point can be achieved by any of many combinations of values, whereby the average time for searching for a null point in each of a series of successive searches is significantly less than when the array of values consists of only a series in which each value is different from each other, and whereby during prolonged periods of use in which some values might undergo small changes from their intended values, the likelihood of inability to reach a null point is significantly less than when the array of values consists of only a series in which each value is different from each other.

3. In an apparatus comprising a transducer directing a variable signal to a balancing circuit generating an error signal, a balance detector responsive to the error signal to actuate a correction signal, a system actuated by the correction signal for inserting or withdrawing separate resistors from an array of resistors for automatically hunting for and attaining a null-point, the improvement which consists of controlling the values of the separate resistors in the array of resistors in accordance with a multiple radix numerical system so that substantially each group of resistors has a plurality of identical resistors, the total numerical value of each smaller group being greater than the value of a member of the next largest group of like-valued resistors, whereby there is a possibility of carryover from one group to another.

4. In an apparatus comprising a transducer directing a variable signal to a bridge circuit generating an error signal, a balance detector responsive to the error signal to actuate a correcting signal, a system actuated by the correction signal for inserting or withdrawing separate resistors from an array of resistors for automatically hunting for and attaining a null-point for balancing said bridge circuit, the improvement which consists of controlling the values of the separate resistors in the array of resistors in accordance with a multiple radix numerical system so that substantially each group of resistors has a plurality of identical resistors, the total numerical value of each smaller group being greater than the value of a member of the next largest group of like-valued resistors, whereby there is a possibility of carryover from one group to another.

5. In an apparatus comprising a transducer directing a variable signal to a balancing circuit generating an error signal, a balance detector responsive to the error signal to actuate a correction signal, a system actuated by the correction signal for inserting or withdrawing separate resistors from an array of resistors for automatically hunting for and attaining a null-point for balancing said circuit, the improvement which consists of controlling the values of the separate resistors in the array of resistors in accordance with a multiple radix numerical system so that substantially each group of resistors has a plurality of identical resistors, the total numerical value of each smaller group being greater than the value of a member of the next largest group of like-valued resistors, whereby there is a possibility of carryover from one group to another, and whereby the null point can be achieved by any of many combinations of resistors, whereby the average time for searching for a null point in each of a series of successive searches is significantly less than when the array of resistors consists of only a series in which each resistor has a value different from each other, and whereby during prolonged periods of use in which some resistors might undergo small changes from their intended values, the likelihood of inability of reaching a null point is significantly less than when the array of resistors consists of only a series in which each resistor has a value different from each other.

6. In an apparatus of the class described, a bridge circuit including means for producing a voltage proportional to the departure of a condition from a set point wherein said condition is measurable in digits, a network producing counter voltage increments corresponding respectively with different units of the departure of said condition from said set point, an error signal generated by the bridge circuit, a balance detector actuated by the error signal, a system for connecting or disconnecting sequentially and cumulatively individual resistors in an array of resistors, and an array of resistors, each resistor having a value indicative of a digit value for measuring the departure from a set point, the digit values corresponding to a multiple radix numerical system, so that substantially each group of resistors has a plurality of identical resistors, the total numerical value of each smaller group being greater than the value of a member of the next largest group of like-valued resistors, whereby there is a possibility of carryover from one group to another, and whereby the null point can be achieved by any of many combinations of resistors, whereby the average time for searching for a null point in each of a series of successive searches is significantly less than when the array of resistors consists of only a series in which each resistor has a value different from each other, and whereby during prolonged periods of use in which some resistors might undergo small changes from their intended values, the likelihood of inability to reach a null point is significantly less than when the array of resistors consists of only a series in which each resistor has a value different from each other.

7. Apparatus in accordance with claim 6 in which the digit values correspond to a triplicate binary numerical system increasing from a series beginning as 1, 1, 1, 2, 2, 2, 4, 4, 4, 8, 8, 8, 16, 16, 16.

8. In an apparatus of the class described in which there is a bridge circuit, a variable electrical resistance of the strain gauge type responsive to the independent variable to be measured, such variation in the resistance of the variable electrical resistance being substantially proportional to the independent variable being measured, and said variable electrical resistance is a component of said bridge circuit, said independent variable and variable electrical resistance being measurable in digits, a balance detection means responsive to the error signal from the bridge circuit, a switching system for connecting and disconnecting individual resistors in an array of resistors when actuated by a correction signal from the balance detection means, said resistors being connected and disconnected into an arm of said bridge circuit for balancing the change of resistance attributable to the independent variable to be measured, and said connecting and disconnecting of resistors sequentially and cumulatively continuing until the hunting for the null point by the logic circuit has successfully balanced the bridge circuit, the digital value of the summation of the selected resistors constituting a measurement of the independent variable, said bridge circuit and said switching system being energized by appropriate voltage sources, the improvement which consists of an array of resistors corresponding to a multiple radix numerical system so that there are a series of groups of individual resistors, there being from three to sixteen equal value resistors in each group, the total numerical value of each smaller group being greater than the value of a member of the next largest group, which next largest group consists of from three to sixteen resistors of equal value, so that in the summation of values, there is the possibility of carryover from one group to another, whereby a plurality of combinations of resistors can balance the bridge circuit.

References Cited by the Examiner
UNITED STATES PATENTS

| | | | |
|---|---|---|---|
| 2,819,054 | 1/58 | Thorsson | 177—211 |
| 2,936,165 | 5/60 | Thorsson | 177—211 |
| 3,077,236 | 2/63 | Green et al. | 177—211 |
| 3,081,831 | 3/63 | Thorsson | 177—211 |

LLOYD McCOLLUM, *Primary Examiner.*